United States Patent
Arai (10) Patent No.: US 8,031,056 B2
(45) Date of Patent: Oct. 4, 2011

(54) REMOTE CONTROLLER AND REMOTE CONTROL METHOD

(75) Inventor: Morito Arai, Tokyo (JP)

(73) Assignee: Sony Corporation, Tokyo (JP)

( * ) Notice: Subject to any disclaimer, the term of this patent is extended or adjusted under 35 U.S.C. 154(b) by 1292 days.

(21) Appl. No.: 11/441,104

(22) Filed: May 26, 2006

(65) Prior Publication Data
US 2006/0279430 A1     Dec. 14, 2006

(30) Foreign Application Priority Data
May 30, 2005   (JP) ................. 2005-157943

(51) Int. Cl.
*G08C 19/00* (2006.01)

(52) U.S. Cl. .................................. 340/12.23

(58) Field of Classification Search ............. 340/825.69, 340/825.72, 825.57, 825.74, 12.22, 12.23, 340/12.24, 12.28, 12.29, 4.11, 4.3, 4.31; 241/176; 341/176
See application file for complete search history.

(56) References Cited

U.S. PATENT DOCUMENTS

| | | | |
|---|---|---|---|
| 5,097,249 A * | 3/1992 | Yamamoto | 340/538.17 |
| 6,507,306 B1 | 1/2003 | Griesau et al. | |
| 2001/0035829 A1 | 11/2001 | Yu et al. | |

FOREIGN PATENT DOCUMENTS

| | | |
|---|---|---|
| EP | 1 061 490 A2 | 12/2000 |
| WO | WO 01/46929 A2 | 6/2001 |

\* cited by examiner

*Primary Examiner* — Brian Zimmerman
*Assistant Examiner* — Nabil Syed
(74) *Attorney, Agent, or Firm* — Oblon, Spivak, McClelland, Maier & Neustadt, L.L.P.

(57) ABSTRACT

A remote controller with a plurality of keys arranged, which remotely controls, upon manipulations of the keys, control-target equipment by transmitting a remote control signal allocated to each of the keys. The remote controller includes a storing section which stores information of a plurality pieces of control-target equipment; an equipment selection operating section which selects control-target equipment to be operated under a remote control from the plurality pieces of control-target equipment whose information is stored in the storing section; a control unit that generates, in a case of manipulation of the equipment selection operating section, a remote control signal to power on the selected control-target equipment, and generates a remote control signal to power off the other control-target equipment information of which is stored in the storing section, except for the selected control-target equipment; and a transmitter for transmitting the remote control signal generated by the control unit.

8 Claims, 8 Drawing Sheets

| OBJECT OF USE | FUNCTION KEY | TV | DVD | VTR | HDD |
|---|---|---|---|---|---|
| VIEWING OF TV | TV | ON | OFF | OFF | OFF |
| DVD PLAYBACK | DVD | ON | ON | OFF | OFF |
| VTR PLAYBACK | VTR | ON | OFF | ON | OFF |
| HDD PLAYBACK | HDD | ON | OFF | OFF | ON |
| POWER OFF OF ALL DEVICES | STANDBY | OFF | OFF | OFF | OFF |
| POWER ON OF ALL DEVICES | SYSTEM ON | ON | ON | ON | ON |
| SEPARATE USE OF EACH DEVICE | INDIVIDUAL FUNCTION KEY | NO COORDINATION | | | |

FIG. 8

REMOTE CONTROLLER AND REMOTE CONTROL METHOD

CROSS REFERENCES TO RELATED APPLICATIONS

The present document contains subject matter related to Japanese Patent Application JP 2005-157943 filed in the Japanese Patent Office on May 30, 2005, the entire contents of which being incorporated herein by reference.

BACKGROUND OF THE INVENTION

1. Field of the Invention

The present invention relates to a remote controller suitable for transmitting, for example, a control signal to a light receiving section provided in an electronic equipment of a television receiver, and a remote control method applicable to the remote controller.

2. Description of Related Art

In the past, a remote controller that transmits a control signal using infrared rays has been used to remotely control video equipment such as a television receiver, and audio equipment, and the like. When the channel tuning operation of the television receiver or the like is performed by using the remote controller, a user selects and presses a numeric key provided on the remote controller. By this operation, a remote control signal allocated to each numeric key is transmitted from the remote controller to the television receiver. In the television receiver, channel tuning positions corresponding to the remote control signals are set in advance. In response to an infrared signal received from the remote controller, the broadcasting station channel is changed. This completes the channel tuning operation.

There is also a system that enables a remote controller to remotely operate various equipment by locating a plurality of input terminals in electronic equipment such as a television receiver or an AV (audio visual) amplifier, and connecting external equipment such as a recorder, a player, and a tuner to the input terminals. The remote controller used in this system can perform an equipment switching that enables the operations of not only the television receiver and the AV amplifier, but also external equipment connected thereto. When switching the operating equipment, a user firstly has to perform an input switching operation on the television receiver. For example, in a case where a first input terminal to a fourth input terminal are provided in the television receiver, the following association is made in advance on the television receiver side. That is, the first input terminal is associated with a DVD (Digital Versatile Disc) recorder, the second input terminal is associated with a video tape recorder, and so on. When selecting the connected external equipment, the input of the television receiver is changed. The above-mentioned remote controller is provided with operation switching keys for selecting equipment to be operated such as the television receiver, the DVD recorder, and an AV amplifier. After changing the input of the television receiver, the user manipulates the operation switching keys of the remote controller so as to change a control mode of the remote controller, allowing the desired equipment to be manipulated.

Here, it is assumed that a user switches from the viewing of a ground wave analog broadcasting to the operation of DVD playback using the DVD recorder. Firstly, the user performs the operation for changing into the input of the DVD recorder connected to the television receiver, and then selects the operation switching key for the DVD recorder in the remote controller. As a result, a remote control signal corresponding to the DVD operation is transmitted by infrared from the remote controller to the television receiver. This enables the user to perform the operations of record, play, stop, and the like of the DVD recorder.

Japanese Patent Application Publication (KOKAI) No. Hei-5-236366 (FIG. 1) describes a technique of outputting, from a remote controller, the operation codes of peripheral equipment connected to a television receiver.

SUMMARY OF THE INVENTION

Normally, as a power operation that controls the power on/off of a television receiver and electronic equipment connected to the television receiver, a remote control signal of a power switching code is transmitted sequentially to a plurality of electronic equipment. Alternatively, the control mode of a remote controller is changed so as to perform individual manipulations for the power on/off of the respective equipment.

Nevertheless, in the related art power control, electric power may be wasted because the powers of ones other than the used electronic equipment will be turned on in the sequential code transmissions corresponding to a plurality pieces of electronic equipment. Further, when the powers of unused electronic equipment are turned off, it is necessary to turn off their respective powers individually. This is time-consuming. In addition, the user might forget to turn off the powers of the unused electronic equipment, failing to manipulate reliably. Likewise, in a case where the user can manipulate GUI (graphical user interface) menus displayed on the television receiver, the user has to care the power off of the unused electronic equipments, and hence feels inconvenience.

There has been a need for overcoming the above-mentioned situations to provide a simple setting of the power on/off of a plurality pieces of electronic equipment when they are remotely controlled.

The present invention is directed to a procedure of a remote control of control-target equipment by transmitting, upon manipulations of a plurality of arranged keys, remote control signals allocated to the keys, respectively. This procedure includes storing information of a plurality pieces of control-target equipment; deciding an equipment selecting operation for selecting a piece of control-target equipment to be operated under a remote control, from the plurality pieces of control-target equipment; generating a remote control signal to power on the control-target equipment selected by the decision; generating remote control signals to power off the stored control-target equipment other than the selected control-target equipment; and transmitting the generated remote control signals.

With this construction, an equipment selecting operation of the remote controller permits a simultaneous power setting to power on electronic equipment to be operated as control-target equipment, and power off electronic equipment not to be operated.

In accordance with the present invention, only by selecting remotely operated equipment through the remote controller by manipulating an equipment selecting operation section, the power on of only desired electronic equipment and the power off of an undesired electronic equipment can be executed simultaneously. This requires no individual manipulations of the power operation keys per equipment, and improves the operability when a plurality pieces of electronic equipment are remotely controlled simultaneously.

DETAIL DESCRIPTION OF THE PREFERRED EMBODIMENTS

One embodiment of the present invention will be described below with reference to the accompanying drawings. The present embodiment describes the case of applying the present invention to a remote controller that performs a remote control of electronic equipment, such as a television receiver and the like, by transmitting a control signal by infrared, through a key manipulation of a user.

Figure 1:
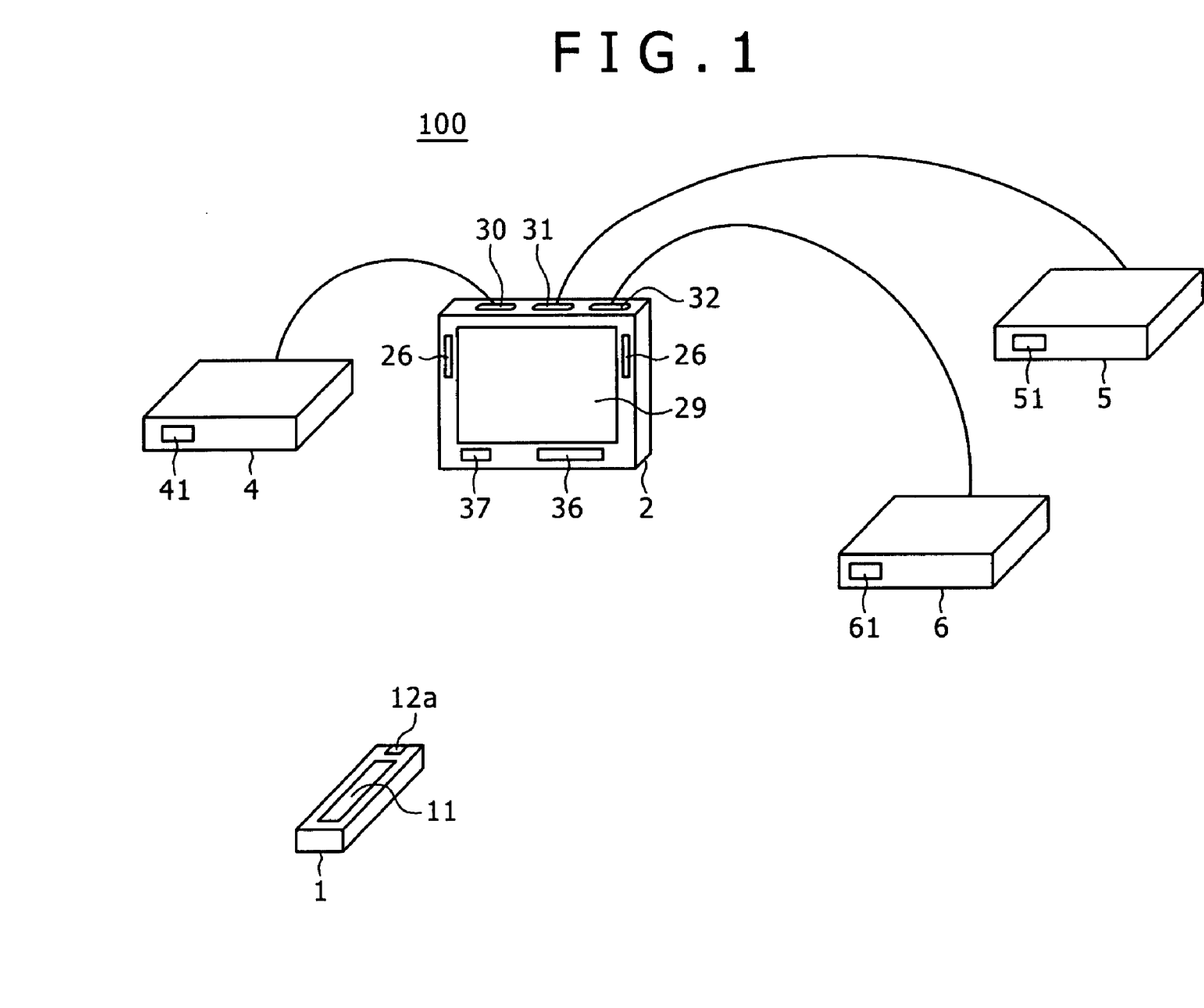
FIG. 1 is a block diagram showing an example of an equipment operating system in one embodiment of the present invention.

An example of the construction of an equipment operating system of the embodiment will first be described with reference to FIG. 1. A television receiver 2 receives television broadcasting programs by converting signals from a broadcast wave received through an antenna (not shown). As peripheral equipment placed externally, there are a DVD recorder 4 that is capable of performing record/play by using an optical disc that meets DVD standards, as a recording medium; a video tape recorder 5 that is capable of performing record/play of video tapes; and an HDD (hard disk drive) recorder 6 that has a mass storage hard disk and is capable of performing record/play of data. These pieces of equipment are cabled to a first input terminal 30, a second input terminal 31, and a third input terminal 32, which are terminals located at the television receiver 2 in order to supply video and audio regenerative signals to the television receiver 2. Such a system that the DVD recorder 4, the video tape recorder 5, and the HDD recorder 6 are connected to the television receiver 2, each of which is operable by the remote controller 1, is employed as an equipment operating system 100 of the present embodiment. The television receiver 2 is provided with a liquid crystal display panel 29, and speakers 26 for outputting audio, which are disposed on opposite sides of the display panel 29, in order to reproduce image data and audio data supplied from television broadcastings, the DVD recorder 4, the video tape recorder 5, and the HDD recorder 6. The television receiver 2 is further provided with an operation section 36 for performing manipulations such as channel tuning and volume setting.

By changing the setting to the television receiver 2, the remote controller 1, by which the user carries out a remote control, is also capable of performing remote controls of the DVD recorder 4, the video tape recorder 5, and the HDD recorder 6. The remote controller 1 is provided with an operation section 11 equipped with various keys, and a transmitter 12 for transmitting infrared signals. Examples of the external construction and the internal construction of the remote controller 1, and the details of processing thereof will be described later.

The DVD recorder 4, the video tape recorder 5, and the HDD recorder 6 are provided with receivers 41, 51, and 61, respectively, which perform photoelectric conversion by detecting the infrared signals transmitted from the remote controller 1. The remote controller 1 has function keys 11$j$ to 11$s$ for switching the operations of later-described registered external equipment. The user selects desired external equipment by switching the function keys 11$j$ to 11$s$. For example, the operation of the function key 11$k$ for "DVD" on the remote controller 1 enables the user to remotely operate the DVD recorder 4 by using the remote controller 1. The television receiver 2 is also provided with a receiver 37 that perform photoelectric conversion by detecting the infrared signals transmitted from the remote controller 1. The manipulation of the function key 11$j$ for "TV" on the remote controller 1 enables the operation of the television receiver 2.

Figure 2:
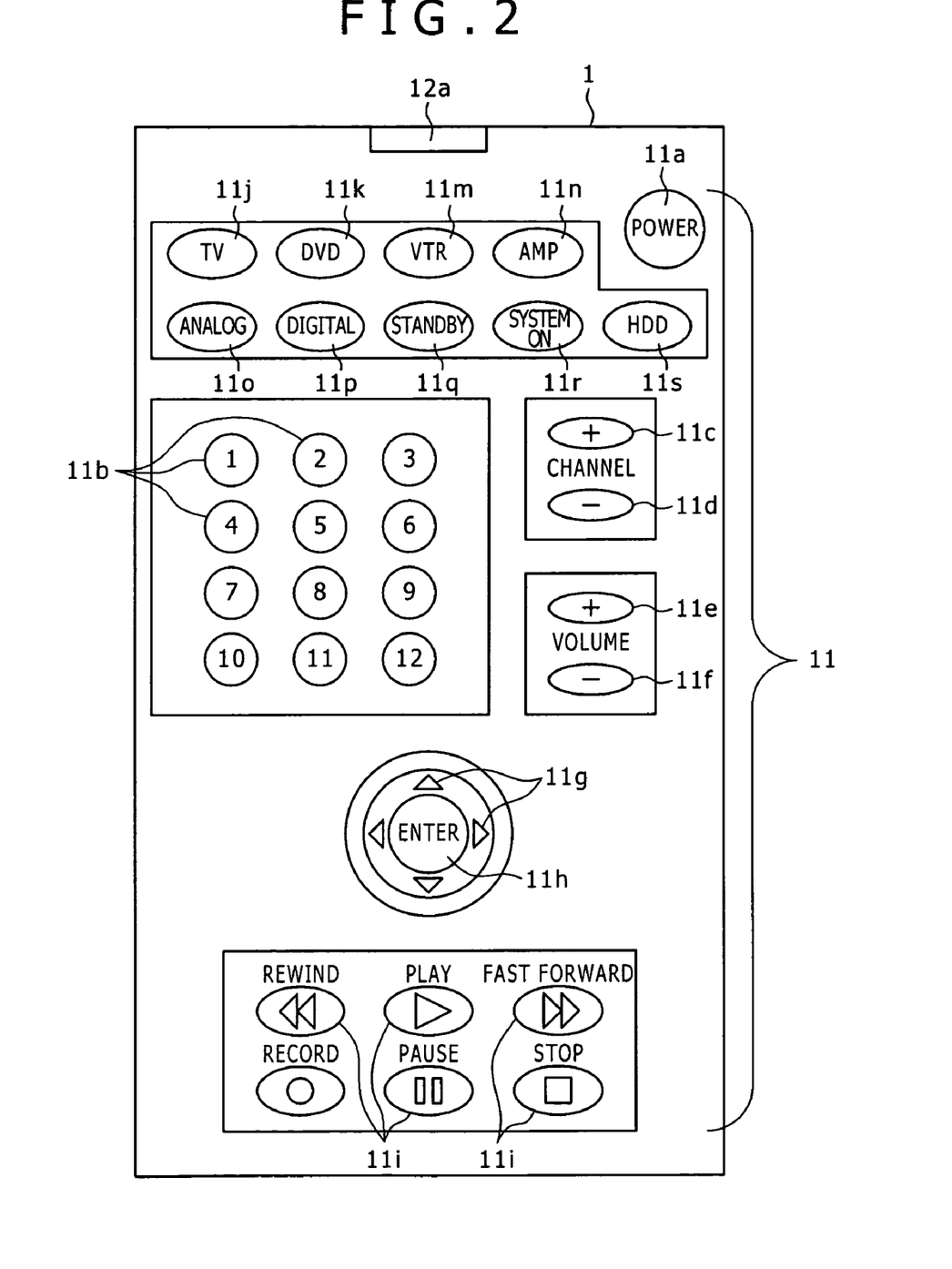
FIG. 2 is an external block diagram showing an example of a remote controller in the first embodiment.

The external construction of the remote controller 1 of the present embodiment will next be described with reference to FIG. 2. The remote controller 1, which is capable of remotely controlling electronic equipment such as a television receiver, has an LED (light emitting diode) 12$a$ as a light emitting element connected to a later-described transmitter 12, so that infrared signals can be transmitted from the LED 12$a$.

The remote controller 1 has the operation section 11 including the various operation keys. The operation section 11 is provided with the function keys 11$j$ to 11$s$, as equipment selecting operation sections for selecting a piece of control-target equipment to be controlled by the remote controller 1. Here, there are provided, for example, the function key 11$j$ for "TV" that is used to switch a control target to the television receiver 2; the function key 11$k$ for "DVD" to switch it to the DVD recorder 4; the function key 11$m$ for "VTR" to switch it to the video tape recorder 5; the function key 11$n$ for "AMP" to switch it to an amplifier (not shown); the function key 11$o$ for "analog" to switch it to analog broadcastings; the function key 11$p$ for "digital" to switch it to digital broadcastings; and the function key 11$s$ for "HDD" to switch it to the HDD recorder 6. Further, there are provided a function key 11$q$ for "standby" to power off the television receiver 2 and all of control targets connected to the television receiver 2; and a function key 11$r$ for "system-on" to power on the television receiver 2 and all of the control targets connected to the television receiver 2. The remote controller 1 of the present embodiment is constructed so that the switching of the control-target equipment through the function keys 11$j$ to 11$s$ enables transmission of such a remote control signal that changes the codes of the control-target equipment in the remote control signals transmitted by the remote controller 1, and also switches the input of the television receiver 2. The operation section 11 is provided with a power key 11$a$ to power on/off of the control-target equipment corresponding to the mode set by the functions keys 11$j$ to 11$s$. A remote control signal for power control, which is transmitted by the manipulation of the power key 11$a$, is a remote control signal to change the equipment power state from its on state to its off state and vice versa. This signal has a different code from a later-described remote control signal for power on, and a later-described remote control signal to power off, which are transmitted by the manipulations of the function keys 11$j$ to 11$s$.

The remote controller 1 has the numbers of "1" to "12" printed thereon, and numerical keys 11$b$ as direct tuning keys that a user directly presses for tuning. With the numeric keys 11$b$, the remote control signals of codes allocated to each key can be transmitted to the television receiver 2 to thereby specify a tuning position. When the equipment operation mode is set to equipment other than the television receiver 2, the individual keys of the numeric keys 11b function as tuning position specifying keys of the set equipment. Channel tuning keys consist of a channel-up key 11c for tuning-position-up, and a channel-down key 11d for tuning-position-down. Likewise, volume control keys consist of a volume-up key 11e to increase volume, and a volume-down key 11f to decrease volume. The channel-up key 11c, the channel-down key 11d, the volume-up key 11e, and the volume-down key 11f function as the keys for the television receiver 2, irrespective of the setting of the operation mode of the remote controller 1.

Direction keys 11g for specifying up, down, right, and left directions, and a decision key 11h for executing the operation of "decision" enable the menus of functions and contents to be displayed on the display screen of the television receiver 2, and also enable a cursor to shift, so that the necessary items can be selected and decided. The operation key 11i, which is used to execute the operations of "rewind," "play," "fast forward," "record," "pause," and "stop" with respect to the DVD recorder 4, the video tape recorder 5, or the HDD recorder 6, will be operable when the mode of the remote controller 1 is the "DVD," the "VTR," or the "HDD."

Figure 3:
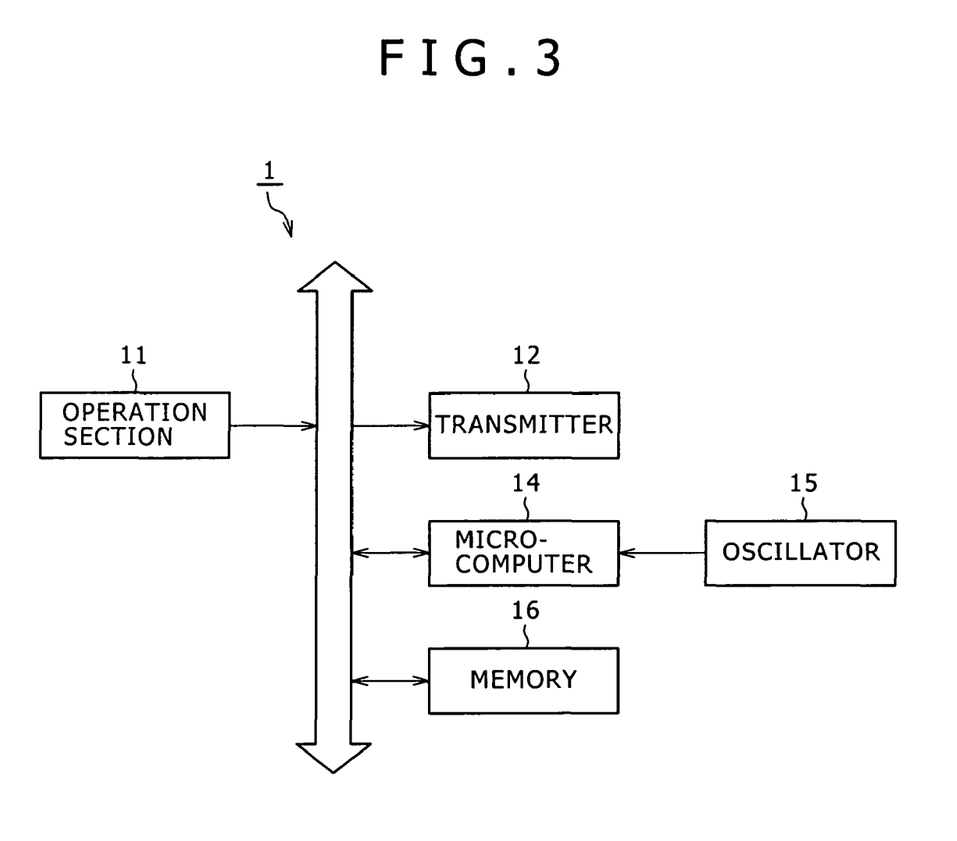
FIG. 3 is an internal block diagram showing the remote controller in the first embodiment.

An example of the internal construction of the remote controller 1 of the present preferred embodiment will next be described with reference to the block diagram of FIG. 3. Signals corresponding to the operations of individual keys within the operation section 11 are supplied to a microcomputer 14 that executes the internal control of the remote controller 1. A memory 16 stores processing programs, parameters, codes corresponding to the operation keys, and the like. The memory 16 also stores information necessary for remotely controlling the control-target equipment controllable by the remote controller 1, so that the information can be used to remotely control a plurality of, or a plurality of kinds of, equipment other than the television receiver 2. The microcomputer 14 supplies remote control signals corresponding to the key operations to the transmitter 12. In the transmitter 12, the supplied remote control signals are subjected to modulation for transmission, and the resulting transmission signals are supplied to a light emitting diode provided in the transmitter 12, and then transmitted.

Figure 4:
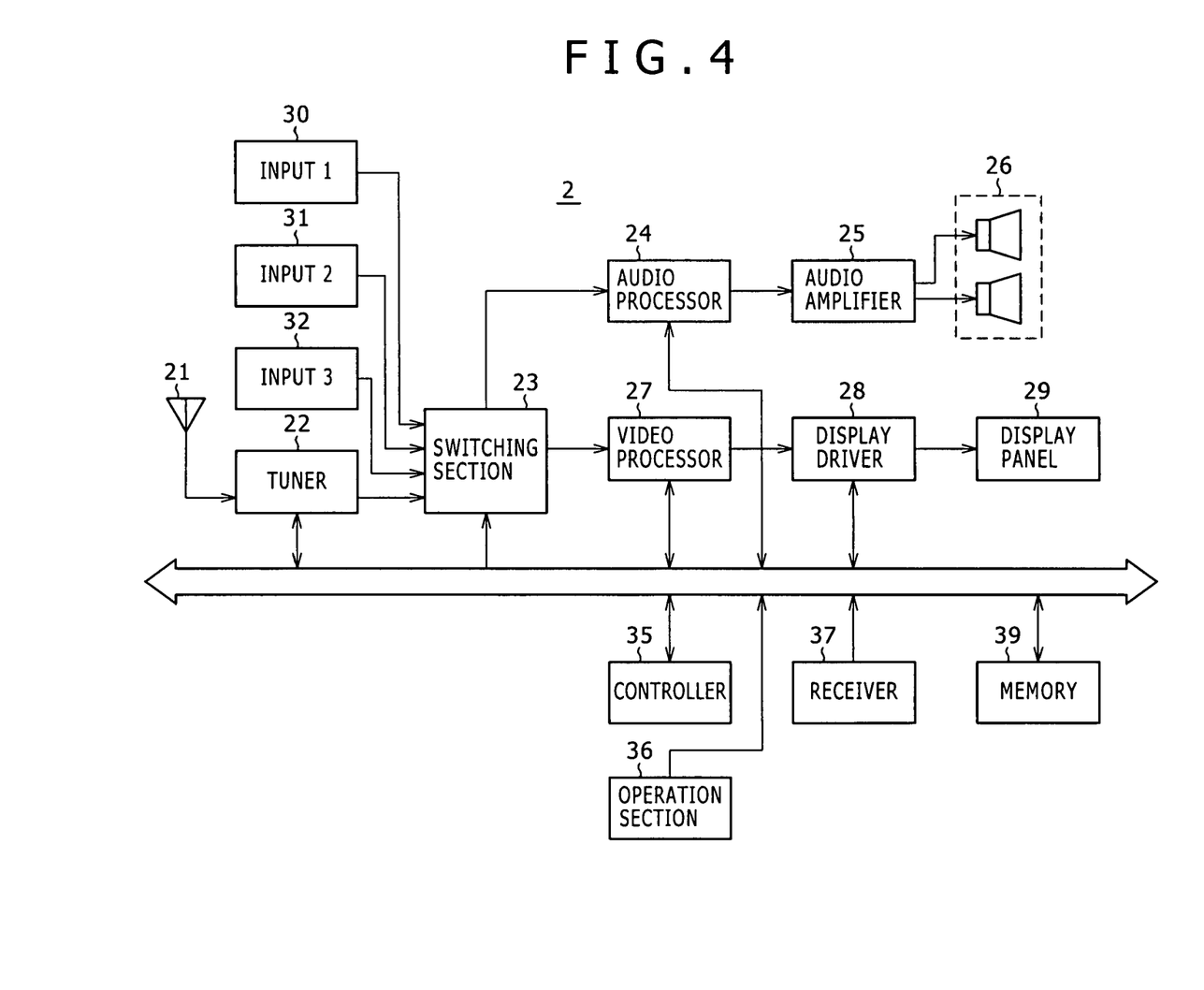
FIG. 4 is an internal block diagram showing an example of a television receiver in the first embodiment.

An example of the internal construction of the television receiver 2 of the present embodiment will next be described with reference to FIG. 4. In this example, a liquid crystal panel is used in a display section. For example, the television receiver 2 receives the broadcasting waves of NTSC (national television standards committee) system by an antenna 21. A tuner 22 for tuning operation is used to select a desired broadcasting station. The video and audio signals tuned by the tuner 22 are supplied to a switching section 23 for switching inputs. The television receiver 2 of the present embodiment is provided with three input terminals, besides the tuner 22, so that the video and audio signals from the external electronic equipment connected to the television receiver 2 can be supplied from any one of the first to third input terminals 30 to 32. If the user desires to view the television receiver 2, its input is switched so as to select any one of the first to third input terminals 30 to 32, or the tuner 22. In audio regeneration, the audio signals supplied from the switching section 23 are subjected to audio signal processing by the audio processor 24, and the audio signals are amplified by an audio amplifier 25, and then released from the two speakers 26.

In audio playback, the video signals supplied from the switching section 23 are supplied to a video processor 27 that performs video processing, and the processed video signals are supplied to a display driver 28. The display driver 28 is made up of a liquid crystal controller for driving liquid crystal, etc. Based on the video signals, the display driver 28 generates driving signals with respect to liquid crystal pixels, so that a color image can be displayed by individually driving the liquid crystal pixels provided on, for example, a liquid crystal panel 29 of active matrix system.

The video and audio signals from the DVD recorder 4, the video tape recorder 5, and the HDD recorder 6, each of which is disposed externally, are supplied to the switching section 23 with the first input terminal 30, the second input terminal 31, and the third input terminal 32 as connecting terminals, respectively. A controller 35, which is configured by arithmetic circuits such as a micro processing unit (MPU), controls the processing of the television receiver 2, and also performs memory control of a memory 39 in which programs, parameters, etc are stored. The memory 39 is a rewritable memory, and performs a table-control of the connected equipments corresponding to inputs as follows:

Input The connected Equipment
Input 1: The DVD recorder 4
Input 2: The Video Tape Recorder 5
Input 3: The HDD recorder 6

In the table setting made at this time, a corresponding table of the connected equipment may be formed by, for example, GUI displays of the television receiver 2, and the input manipulations of the user corresponding to the displays, so that the remote controller 1 may capture the corresponding table. In an alternative, the memory 39 may store the user's latest manipulation and the latest broadcasting image. The user operates the operation panel on the front of the television receiver 2 by manipulating the operation section 36 provided with various keys.

A receiver 37, having a phototransistor and a photodetector as light receiving means of infrared rays, performs photoelectric conversion of the infrared signals supplied from the remote controller 1, followed by modulation processing thereof. The resulting signals are supplied to the controller 35 that performs a predetermined processing.

Figure 5:
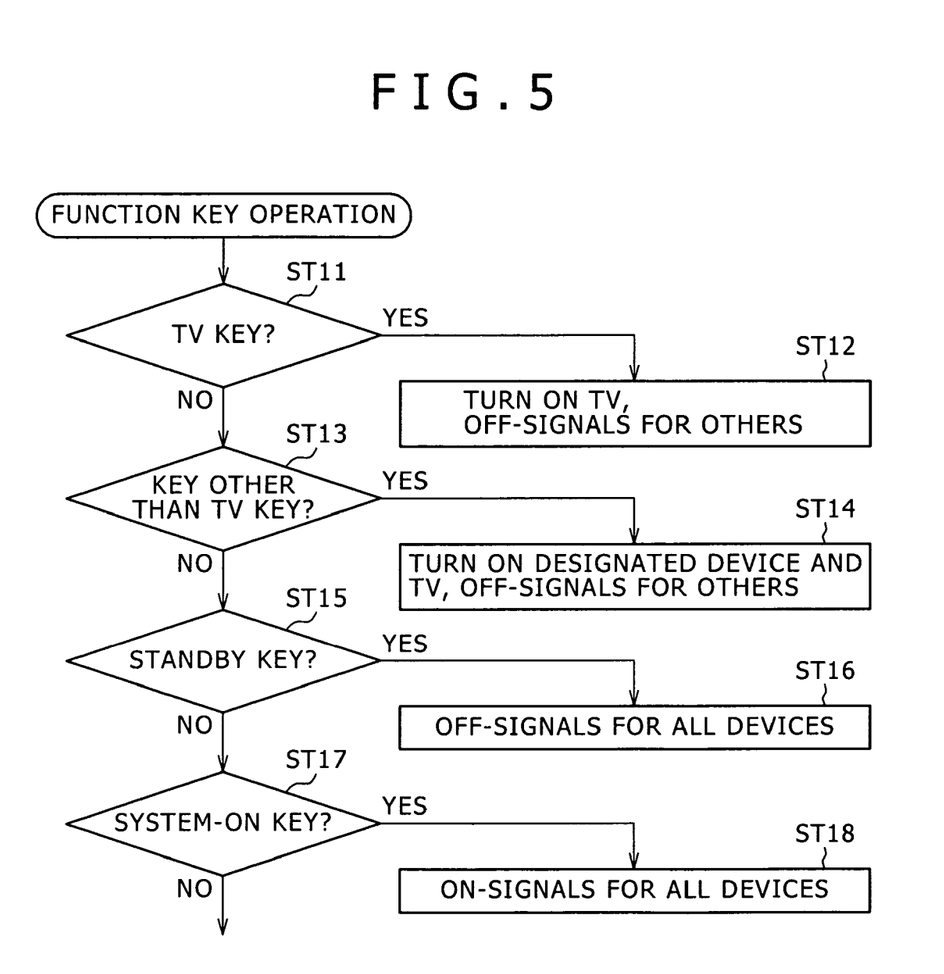
FIG. 5 is a flow chart showing an example of the control of the remote controller in the first embodiment.

An example of the processing in the microcomputer 14 as a controller, in a case where the function keys 11j to 11s of the remote controller 1 are manipulated, will next be described with reference to the flow chart of FIG. 5. Firstly, it is judged whether or not the manipulated function key is the key 11j for "TV" (step ST11). If judged to be the function key 11j for "TV", the microcomputer 14 generates a remote control signal to power on the television receiver 2, and further a remote control signal to power off the other equipments operable by the remote controller 1, and causes the generated remote control signals to be transmitted as infrared signals from the transmitter 12 (step ST12). At this time, there is set such an operation mode that the television receiver 2 corresponds to the equipment operable by the operation section 11 such as the keys 11a to 11e of the remote controller 1.

In a case of judged to be not the key 11j for "TV" in step ST11, it is judged whether or not the operated key is the function key for specifying the individual equipment other than the "TV" (step ST13). In a case of judged to be the manipulation of the function key of equipment other than the "TV," remote control signals to power on the operated equipment and the television receiver 2, and remote control signals to power off the other equipments operable by the remote controller 1 are generated. These generated remote control signals are transmitted as infrared signals from the transmitter 12 (step S14). Set at this time is such an operation mode in which the equipment designated by the function key corresponds to the equipment operable by the operation section 11, such as the keys 11a, 11b, 11g, 11h, and 11i of the remote controller 1.

In a case where the operated key is judged to be not the key that specifies the equipment in step ST13, it is judged whether or not a standby key (step ST15). In a case where the operated key judged to be the manipulation of the standby key, a remote control signal to power off all of the equipment registered operable by the remote controller 1 is generated. The generated remote control signal is then transmitted as an infrared signal from the transmitter 12 (step ST16).

In a case where the operated key is judged to be not the standby key in step ST15, it is judged whether or not a system key (step ST17). In a case where the operated key is judged to be the manipulation of the system key, a remote control signals to power on all of the equipments registered operable by the remote controller 1 is generated. The generated remote control signal is then transmitted as an infrared signal from the transmitter 12 (step ST18). Set at this time is such an operation mode in which the television receiver 2 corresponds to the equipment operable by the operation section 11, such as the keys 11*a*, 11*b*, 11*g*, 11*h*, and 11*i* of the remote controller 1.

Figure 6:
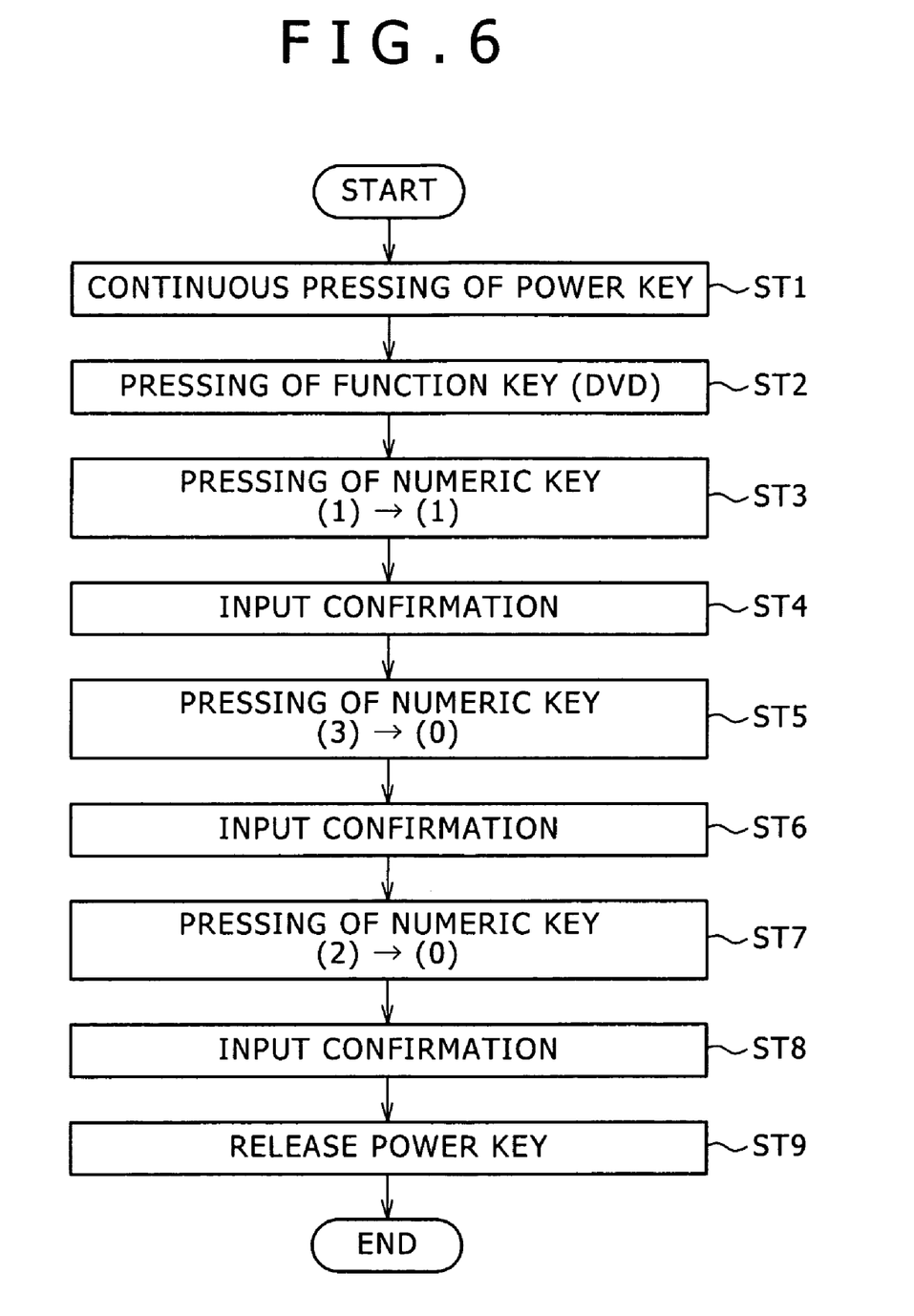
FIG. 6 is a flow chart showing an example of the operation of the remote controller in the first embodiment.

An example of the operations of electronic equipment by the remote controller 1 will next be described with reference to the flow chart of FIG. 6.

When a plurality pieces of electronic equipment are connected to a television receiver, it is less likely to use all of the electronic equipment at the same time. Therefore, it is required to power on only electronic equipment to be used (for example, the television receiver 2 and the DVD recorder 4). If pressed the function keys set for each of the desired electronic equipment, a power control is made in the following manner that a power on code is transmitted to the electronic equipment that is set to "use," and a power off code is transmitted to the electronic equipment that is set to "not use."

The following is an example of associations between keys used in setting power on/power off of the electronic equipment, and the contents of the settings. The user can make a power setting of the electronic equipment connected to the television receiver 2 by inputting the following numeric values in a predetermined procedure using the numeric keys 11*b*.

Key Value Contents of Settings
"10" Power off of the DVD recorder 4
"11" Power on of the DVD recorder 4
"12" No code transmission to the DVD recorder 4
"20" Power off of the video tape recorder 5
"21" Power on of the video tape recorder 5
"22" No code transmission to the video tape recorder 5
"30" Power off of the HDD recorder 6
"31" Power on of the HDD recorder 6
"32" No code transmission to the HDD recorder 6

The user has the memory 16 of the remote controller 1 store a table for setting the power on/power off of the electronic equipment for each of the above-mentioned key values. For example, the inputs of "1" and "0" in this order through the numeric keys 11*b* gives such a setting as to power off the DVD recorder 4 in a certain mode. The term "no code transmission" indicated for the key numeric values (12), (22) and (33) is the item that is set so as not to transmit any unnecessary code when the electronic equipments are not connected to the television receiver 2.

An example of processing for power settings of electronic equipment will next be described with reference to the flow chart of FIG. 6. The following is a power setting when using the DVD recorder 4. Firstly, the power key 11*a* is pressed. The power key 11*a* remains pressed until the setting is completed (step ST1). Then, the key 11*k* for "DVD" among the function keys is pressed (step ST2). The numeric keys 11*b* are used to input "1" and then "1" (step ST3). This gives the power on of the DVD recorder 4. The decision key 11*h* is then pressed to confirm the input (step ST4).

The numeric keys 11*b* are used to input "3" and then "0" (step ST5). This gives the power off of the HDD recorder 6. The decision key 11*h* is then pressed to confirm the input (step ST6).

The numeric keys 11*b* are used to input "2" and then "0" (step ST7). This gives the power off of the video deck 5. The decision key 11*h* is then pressed to confirm the input (step ST8). Finally, the power key 11*a* that remains pressed is released to terminate the setting processing (step ST9).

This setting permits batch power control, whereby, when the user selects the "DVD" by the function key, the remote controller 1 transmits the television receiver 2 such a power control signal as to power on the DVD recorder 4, and power off the video tape recorder 5 and the HDD recorder 6.

Figure 7:
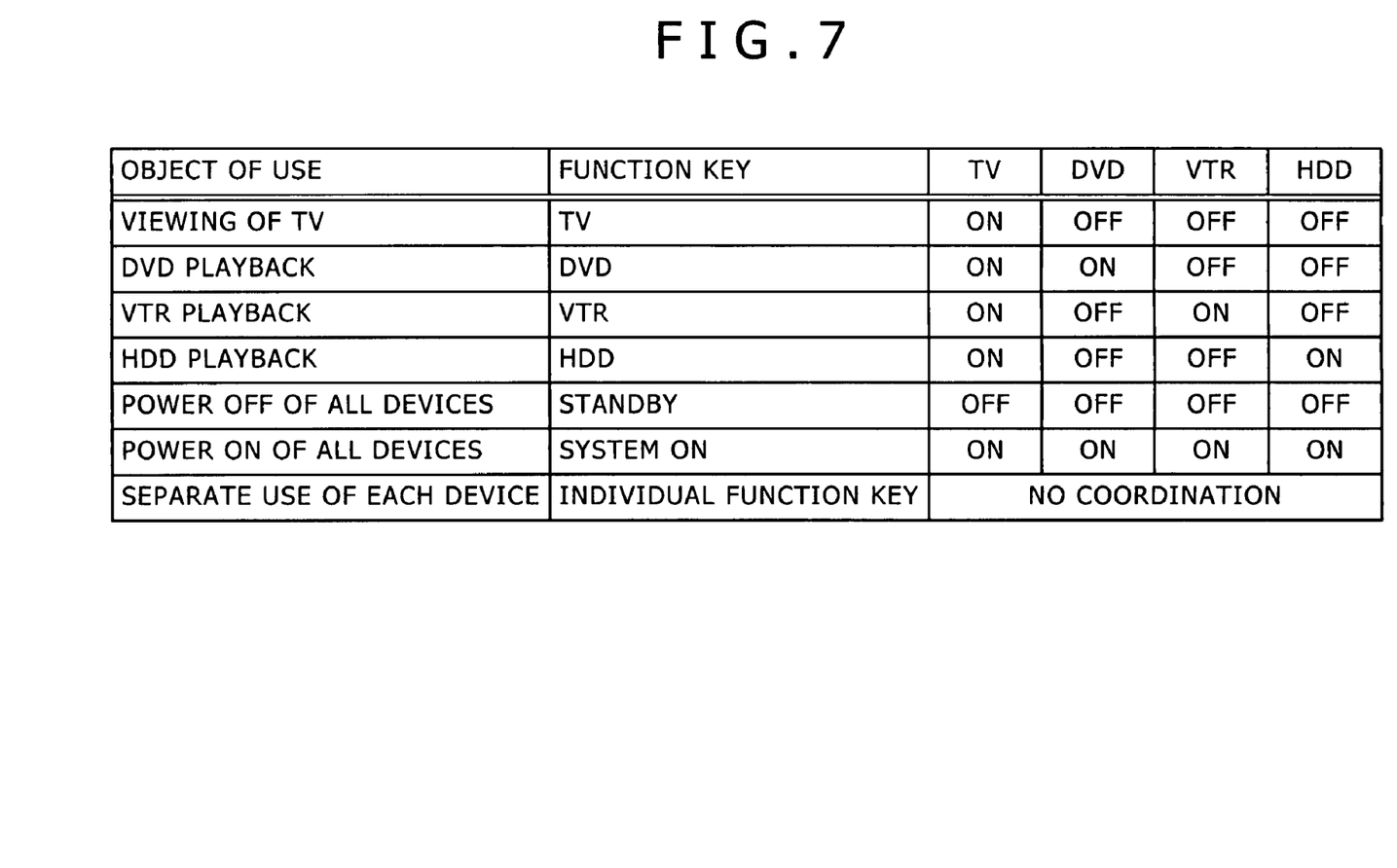
FIG. 7 is an explanatory diagram showing an example of power setting of connected electronic equipment in the first embodiment.

Here, an example of power settings of the electronic equipment connected to the television receiver 2 will be described with reference to FIG. 7. FIG. 7 shows the function keys that the user presses to use desired contents, and the power settings of electronic equipment that corresponds to each of these keys. If the user desires to view a broadcasting only with the television receiver 2, the user presses the function key 11*j* for "TV." This gives the power on of the television receiver 2, and the DVD recorder 4, the video tape recorder 5, and the HDD recorder 6.

Similarly, in a case of a DVD playback, the user presses the function key 11*k* for "DVD." This gives the power on of the television receiver 2 and the DVD recorder 4, and the power off of the video tape recorder and the HDD recorder 6. In a case of a VTR playback, the user presses the function key 11*m* for "VTR." This gives the power on of the television receiver 2 and the video tape recorder 5, and the power off of the DVD recorder 4 and the HDD recorder 6. In a case of an HDD playback, the user presses the function key 11*s* for "HDD." This gives the power on of the television receiver 2 and the HDD recorder 6, and the power off of the DVD recorder 4 and the video deck 5.

In a case of the power off of all of the equipments, the user presses the function key 11*q* for "standby." This gives the power off of the television receiver 2, the DVD recorder 4, the video tape recorder 5, and the HDD recorder 6. On the other hand, if desired the power on of all of the equipments, the user presses the function key 11*r* for "system on." This gives the power on of the television receiver 2, the DVD recorder 4, the video tape recorder 5, and the HDD recorder 6.

It is possible to make no power setting for each electronic equipment for an ordinary operation. In this case, even if the function key is designated to operate the electronic equipment, the other equipment will not be automatically switched between power on and power off.

Meanwhile, the power code transmission executed through the function keys depends on neither the on state nor the off state of the electronic equipment. Normally, the switching of the power through the power key 11*a* depends on the on state/off state of the electronic equipment. That is, if electronic equipment is in its on state, its power is turned off, and if the electronic equipment is in its off state, its power is turned on. On the contrary, when the power is switched with the function key, the remote controller 1 can transmit an on signal when the electronic equipment is in its on state, and an off signal when it is in its off state. If such a signal is transmitted, the state remains unchanged, and the operation of the electronic equipment is not affected.

This permits a simple power setting of the television receiver 2 and the electronic equipment connected to the television receiver 2.

In accordance with the foregoing preferred embodiment, the power on/off of desired electronic equipment and undesired electronic equipment can be suitably operated in response to a mode switching. This reduces the time and the labor for the power on/off by individual mode switching, and also prevents the user from forgetting to turn off the power.

By employing the remote controller 1 provided with the functions implemented in the foregoing preferred embodiment, the power of the undesired electronic equipment can be turned off reliably, permitting a reduction in the entire power consumption of the equipment operating system 100.

Although the foregoing preferred embodiment uses the memory housed in the remote controller 1, the use of another storage medium produces the same effect. In an alternative, if the setting of a remote controller is stored in a removable memory card, this setting can be read when this memory card is mounted on another remote controller. This eliminates the time and the labor to perform the same setting again. In other alternative, a power setting is made by external equipment such as a computer device, and this power setting is stored in a removable memory card. Reading this setting by the remote controller 1 realizes a simple power control of the equipments.

In the foregoing embodiment, when the power setting of the equipments is performed with the remote controller 1, the power key 11a remains pressed until the setting processing is terminated. Instead of the power key 11a, other key may be used. Alternatively, individual power setting keys may be provided.

Although the foregoing embodiment has described the processing that the user sets individually the power on/off for each of the electronic equipment, a plurality of combinations of electronic equipment previously initialized in the remote controller 1 may be selected and set in order to simplify the setting operation. In this case, the user may arbitrarily make a power setting for the desired purpose.

In the foregoing embodiment, the association between the inputs stored in the memory of the remote controller and the setting modes is as follows: the first input is associated with the DVD recorder 4; the second input is associated with the video tape recorder 5; and the third input is associated with the hard disk recorder 6. However, without limiting to this association, various manners may be used. For example, the video tape recorder 5 may be connected to the first input. Alternatively, a plurality of inputs may be provided so as to set necessary connecting equipment.

Alternatively, the function keys for "TV," "DVD," "VTR," "AMP," etc. may be of a self-illuminated key that lights up by LED, or the like, so as to display the set mode key, while illuminating it for a certain period of time. By lighting up the self-illuminated key of the operating equipment in response to the input, visual observation is facilitated, and operational errors are avoidable.

Alternatively, an external input terminal connected to an external network may be provided in the remote controller 1, so that various data can be downloaded via the network. Recently, a various pieces of new electronic equipment have been proposed. Hence, by downloading programs, data, and the like via the network, it is possible to comply with the connections to the recent electronic equipment, and make power setting thereof.

In the foregoing embodiment, the present invention is applied to the equipment operating system with the various kinds of peripheral equipment connected to the television receiver. In an alternative, the present invention may be constructed as a remote controller for an operation system in which the input of an audio signal is switched, and a CD (compact disc) playback apparatus, a tuner, etc. are connected to an amplifier for processing the switched audio signal. In other alternative, peripheral equipment such as a printer and a storage unit may be connected to a computer, allowing a remote controller to perform batch operation of the above-mentioned equipment and these peripheral equipment.

Although in the foregoing preferred embodiment, the present invention is applied to the remote controller that transmits infrared signals, it may be applied to a remote controller that transmits high-frequency radio signals of other signal system. Alternatively, the present invention is applicable to a remote controller connected by a communication cable.

Figure 8:
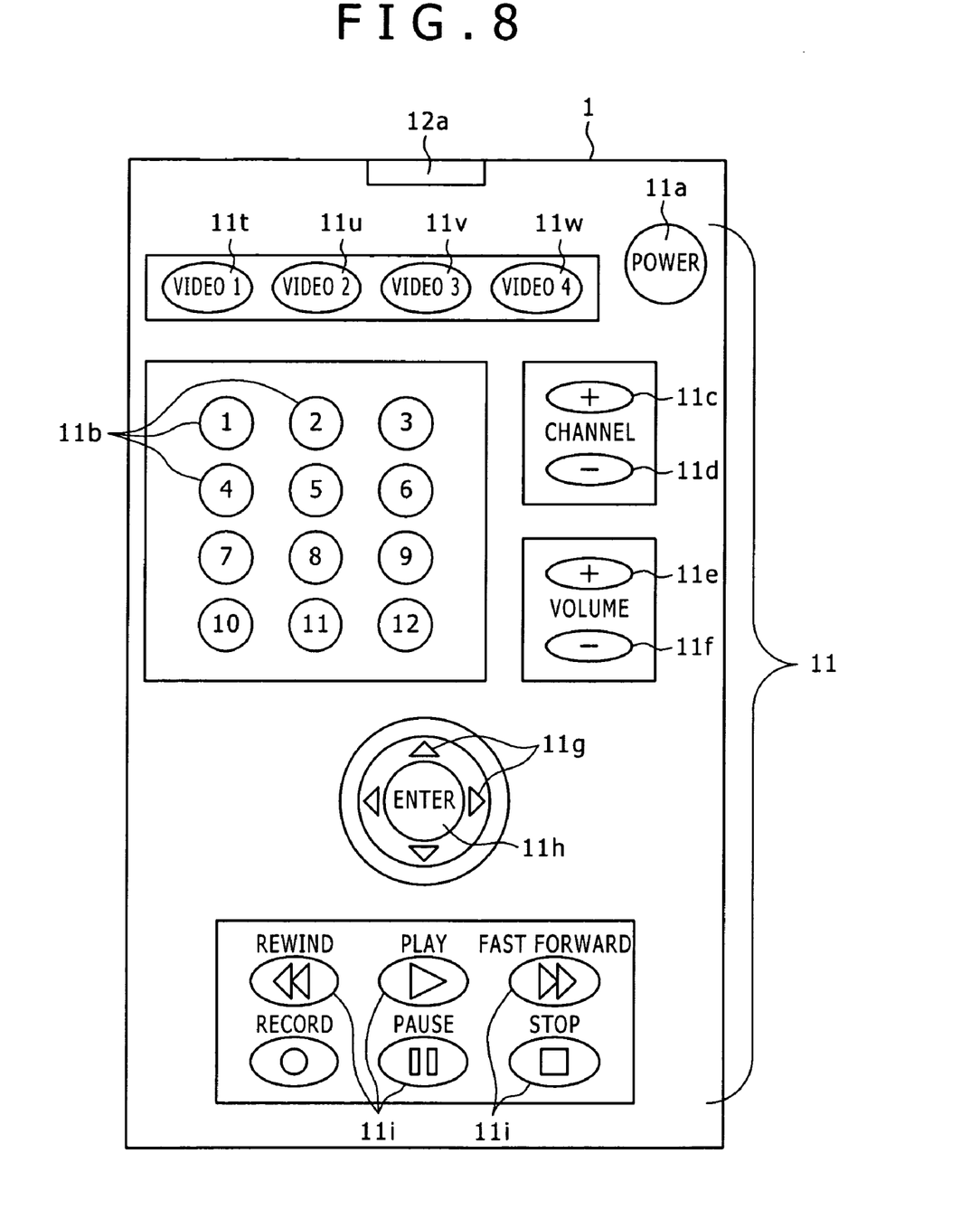
FIG. 8 is an external block diagram showing an example of a remote controller in another embodiment of the present invention.

In the foregoing embodiment, the mode switching is carried out by the function keys such as the keys for "TV," "DVD", "VTR", "AMP" and the like. These function keys may be replaced with input switching keys 11t, 11u, 11v, and 11w for specifying the input switching of equipment, a television receiver in this case, such as "VIDEO 1,"..., "VIDEO 4," in response to a plurality of inputs, as shown in FIG. 8. An example of the external construction of a remote controller provided with the input switching keys, which do not depend on the electronic equipment name, will be described here by referring to FIG. 8. In FIG. 8, the same references have been used as in the above-mentioned FIG. 2 for similar parts. In this case, the input switching key lit of the "VIDEO 1" corresponds to the first input terminal 30, the input switching key 11u of the "VIDEO 2" corresponds to the second input terminal 31, and the input switching key 11v of the "VIDEO 3" corresponds to the third input terminal 32. The input switching key 11w of the "VIDEO 4" corresponds to other input terminal (not shown). For example, if the user presses the input switching key 11t of the "VIDEO 1," the input of the television receiver 2 is set to "the first input terminal," so that video and audio signals are supplied from the DVD recorder 4. For the same equipment setting as the above-mentioned example, a remote control signal to give the power on of the DVD recorder 4, and remote controller signals to give the power off of the other connecting equipment are transmitted. Thus, the use of the input switching keys permits the same control as the foregoing preferred embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. A remote controller with a plurality of keys arranged, which remotely controls, upon manipulations of the keys, control-target equipment by transmitting a remote control signal allocated to each of the keys, the remote controller comprising:

an input section which receives a first list and a second list from a user, the first list including which control-target equipment should be turned on when a power command is entered by the user and the second list including which control-target equipment should be turned off when the power command is entered by the user;

a storing section which stores information of a plurality of pieces of control-target equipment, the storing section storing the first list and the second list;

an equipment selection operating section which selects control-target equipment to be turned on or off under a remote control from the plurality pieces of control-target equipment information of which is stored in the storing section, the equipment selection operating section turning on or off control-target equipment based on the first list and the second list;

a control unit that generates, when the power command is entered, a single remote control signal to power on the control-target equipment and to power off the other control-target equipment based on the first list and the second list; and a transmitter for transmitting the single remote control signal generated by the control unit.

2. The remote controller according to claim 1, further comprising:

a power key for performing power control of the control-target equipment selected by the manipulation of the equipment selecting operation section is provided as one of the keys, and the control unit generates a remote control signal for changing a power-on state or a power-off state that is presently set, into a reverse state thereof, as a remote control signal to be generated in a case where the power key is manipulated, and generates a remote control signal for directly specifying a power-on or a power-off, as a remote control signal to be generated in a case where the equipment selecting operation section is manipulated.

3. The remote controller according to claim 1, wherein one of the plurality pieces of control-target equipment is video equipment or audio equipment that process an inputted video signal or audio signal, and the equipment selection operating section is an operation section for selecting the video equipment or the audio equipment, and equipment connectable to the video equipment or the audio equipment.

4. The remote controller according to claim 1, wherein the control-target equipment is video equipment or audio equipment that process an inputted video signal or audio signal, and the control unit generates, in a case of a manipulation of the equipment selecting operation section, a remote control signal for switching an input video signal or an input audio signal in the video equipment or the audio equipment.

5. A remote control method for remotely controlling, in a case of manipulations of a plurality of arranged keys, control-target equipment by transmitting a remote control signal allocated to each of the keys, the method comprising:

receiving a first list and a second list from a user, the first list including which control-target equipment should be turned on when a power command is entered by the user and the second list including which control-target equipment should be turned off when the power command is entered by the user;

storing information of a plurality pieces of control-target equipment, the information including the first list and the second list;

deciding an equipment selecting operation to turn on or off a piece of control-target equipment to be operated under a remote control from the plurality pieces of control-target equipment information of which are stored in the storing information based on the first list and the second list;

generating a single remote control signal to power on the control-target equipment selected by the deciding an equipment selecting operation and to power off the other control-target equipment based on the first list and the second list when the power command is entered; and transmitting the remote control signal generated by the generating a single remote control signal.

6. The method according to claim 5, wherein the first list includes at least two control-target equipment to power on and the second list includes at least two other control-target equipment to power off.

7. The remote controller according to claim 1, wherein the first list includes at least two control-target equipment to power on and the second list includes at least two other control-target equipment to power off.

8. The remote controller according to claim 1, further comprising:

a first button that enters the power command when operated by user;

a second button that turns on a television and turns off all other equipment when operated by a user;

a third button that turns off all equipment when operated by a user; and a fourth button that turns on all equipment when operated by a user.

* * * * *